(12) United States Patent
Kwon (10) Patent No.: US 10,054,723 B2
(45) Date of Patent: Aug. 21, 2018

(54) PRISM SHEET AND LIQUID CRYSTAL DISPLAY DEVICE HAVING THE SAME

(71) Applicant: LG Display Co., Ltd., Seoul (KR)

(72) Inventor: YoonHo Kwon, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 5 days.

(21) Appl. No.: 14/953,832

(22) Filed: Nov. 30, 2015

(65) Prior Publication Data

US 2016/0154147 A1 Jun. 2, 2016

(30) Foreign Application Priority Data

Dec. 2, 2014 (KR) .......................... 10-2014-0170735

(51) Int. Cl.
*G02F 1/1335* (2006.01)
*G02B 5/04* (2006.01)
*F21V 8/00* (2006.01)

(52) U.S. Cl.
CPC ........... *G02B 5/045* (2013.01); *G02B 6/0053* (2013.01); *G02F 2001/133607* (2013.01)

(58) Field of Classification Search
CPC .................. G02B 5/045; G02B 6/0053; G02F 2001/133607; G02F 1/133606
See application file for complete search history.

(56) References Cited

U.S. PATENT DOCUMENTS

| 2005/0141844 A1* | 6/2005 | Olczak | G02B 5/0231 |
| | | | 385/146 |
| 2006/0176565 A1 | 8/2006 | Nagao | |
| 2007/0258030 A1* | 11/2007 | Kimura | G02B 5/045 |
| | | | 349/122 |
| 2009/0167985 A1* | 7/2009 | Ha | G02B 3/0006 |
| | | | 349/64 |
| 2009/0303416 A1* | 12/2009 | Jeong | G02B 5/045 |
| | | | 349/64 |
| 2009/0323310 A1* | 12/2009 | Chang | G02B 5/045 |
| | | | 362/97.1 |
| 2011/0051046 A1* | 3/2011 | Kim | G02B 5/02 |
| | | | 349/65 |

(Continued)

FOREIGN PATENT DOCUMENTS

| CN | 101233431 | 7/2008 |
| CN | 102207566 | 10/2011 |

(Continued)

OTHER PUBLICATIONS

Office Action for Chinese Patent Application No. CN 201510855592.X, dated Aug. 1, 2017, 14 Pages. (With English Translation).

*Primary Examiner* — Nathanael R Briggs
(74) *Attorney, Agent, or Firm* — Fenwick & West LLP (57) ABSTRACT

A prism sheet and a liquid crystal display (LCD) device having the same are provided to improve optical efficiency of the prism sheet by changing a refractive angle of light, which is incident at an angle less than a minimum angle to an effective angle, by forming a concave surface on a bottom surface of prism patterns. Optical efficiency of the prism sheet is also improved by refracting light, which is incident at an angle more than a maximum angle, toward the adjacent prism pattern, by forming the bottom surface of the $2n^{th}$ prism pattern in a groove of a base film.

10 Claims, 10 Drawing Sheets

(56) References Cited

U.S. PATENT DOCUMENTS

2013/0286663 A1* 10/2013 Kim .................. G02B 5/045
362/339
2016/0341883 A1* 11/2016 Yang .................. B29C 59/026

FOREIGN PATENT DOCUMENTS

DE 102012221592 5/2014
JP 2010039091 2/2010
JP 2010039091 A * 2/2010

* cited by examiner

PRISM SHEET AND LIQUID CRYSTAL DISPLAY DEVICE HAVING THE SAME

CROSS-REFERENCE TO RELATED APPLICATION

Pursuant to 35 U.S.C. § 119(a), this application claims the benefit of earlier filing date and right of priority to Korean Application No. 10-2014-0170735, filed on Dec. 2, 2014, the contents of which is incorporated by reference herein in its entirety.

BACKGROUND

1. Field of the Invention

The present disclosure relates to a prism sheet, and more particularly, to a prism sheet with improved optical efficiency and a liquid crystal display device having the same.

2. Background of the Related Art

Display devices act as visual information output media that provide various types of images to users. Consumers require that display devices meet certain requirements, such as exhibiting low power consumption, having a thin form factor, being lightweight, and being capable of outputting high resolution images.

Display devices may be classified into an emissive type and a transmissive type. The spontaneous light emitting (emissive) type includes Cathode Ray Tube (CRT) devices, Electro Luminescence (EL) devices, Organic Light Emitting Diode (OLED) devices, Vacuum Fluorescent Display (VFD) devices, a Field Emission Display (FED) devices, Plasma Display Panel (PDP) devices, and the like. The non-spontaneous light emitting (transmissive) type includes Liquid Crystal Display (LCD) devices and the like.

LCD devices operate to output images by using the optical anisotropy characteristics of liquid crystals. Such LCD devices have been widely used as a display device because of relatively low heat generation, excellent visibility characteristics, and low average power consumption compared to conventional cathode-ray tube devices. Hereinafter, a typical LCD device will be described in more detail.

In general, the LCD device may display a desired image by controlling a light transmittance of pixels by individually supplying a data signal corresponding to image information to each of the pixels. The LCD device includes a liquid crystal panel where pixels are arranged in a matrix form, a driving unit configured to drive the pixels, and a backlight configured to supply light to the liquid crystal panel.

Figure 1:
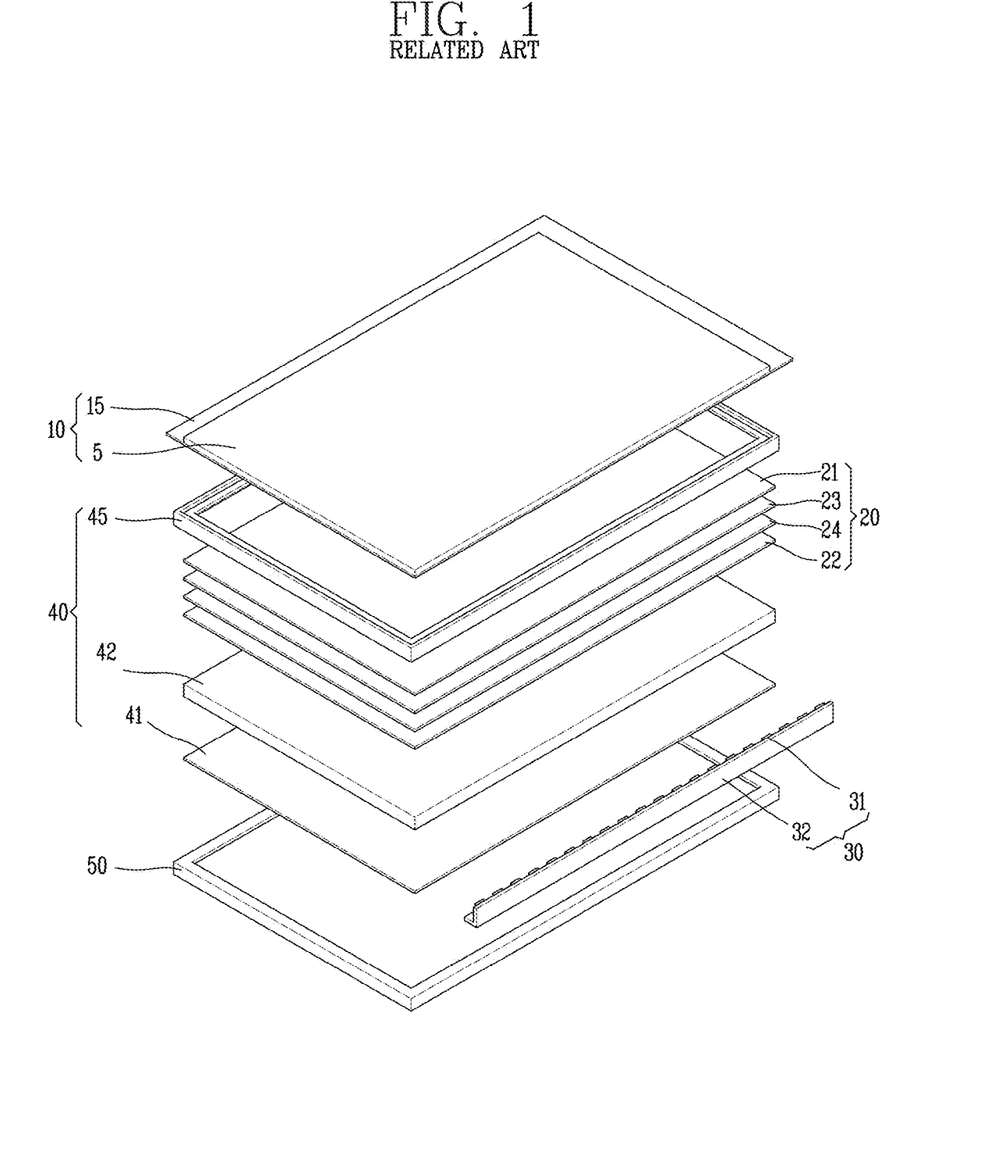
FIG. 1 is an exploded perspective view schematically showing a structure of a general liquid crystal display device.

FIG. 1 is a schematic exploded perspective view showing a structure of a related art LCD device.

Referring to FIG. 1, the related art LCD device includes a liquid crystal panel 10 configured to output images via pixels arranged in a matrix form, a driving unit configured to drive the pixels, a backlight 40 mounted on a rear surface of the liquid crystal panel 10 and configured to supply light to a front surface of the liquid crystal panel 10, and a lower cover 50 configured to accommodate the liquid crystal panel 10 and the backlight 40 therein.

The liquid crystal panel 10 includes a color filter substrate 5, a TFT array substrate 15, and a liquid crystal layer which is formed in a cell gap between the color filter substrate 5 and the TFT array substrate 15. The color filter substrate 5 and the TFT array substrate 15, disposed to face each other, are attached to each other such that the cell gap is maintained.

The liquid crystal panel 10 further includes a common electrode and a pixel electrode configured to apply an electric field to the liquid crystal layer.

When a voltage of a data signal applied to the pixel electrode is controlled in a state where such voltage is applied to the common electrode, the liquid crystal panel 10 operates to display text or images by passing or blocking light for each pixel by rotating liquid crystals of the liquid crystal layer by dielectric anisotropy according to the electric field created between the common electrode and the pixel electrode.

A switching device such as a thin film transistor (TFT) is separately provided at each pixel such that the voltage of the data signal applied to the pixel electrode is controlled per pixel.

Upper and lower polarizing plates are attached on an outer surface of the liquid crystal panel 10. In this case, the lower polarizing plate acts to polarize light which has passed through the backlight 40, and the upper polarizing plate acts to polarize light which has passed through the liquid crystal panel 10.

The backlight 40 will be explained more specifically. A light source, such as a light emitting diode (LED) assembly 30 configured to generate light is installed at one side of a light guide plate 42, and a reflection plate 41 is installed on a rear surface of the light guide plate 42. The LED assembly 30 includes an LED array 31 and an LED printed circuit board (PCB) 32 having circuits configured to drive the LED array 31.

Light emitted from the LED array 31 is incident onto a side surface of the light guide plate 42 made of a transparent material. The light transmitted to the rear surface of the light guide plate 42 is reflected toward optical sheets 20 disposed on an upper surface of the light guide plate 42 by the reflection plate 41. In such manner, loss of light is reduced and uniformity of light is enhanced.

The liquid crystal panel 10 is mounted on an upper portion of the backlight 40 by using a guide panel 45. A lower cover 50 is coupled to a lower portion of the backlight 40, thereby constituting a LCD device.

The optical sheets 20 may include upper and lower diffusion sheets 21 and 22, and upper and lower prism sheets 23 and 24. The upper and lower prism sheets 23 and 24 collect light transmitted from the lower diffusion sheet 22, and make the light be uniformly incident onto a front surface of the liquid crystal panel 10.

Figure 2:
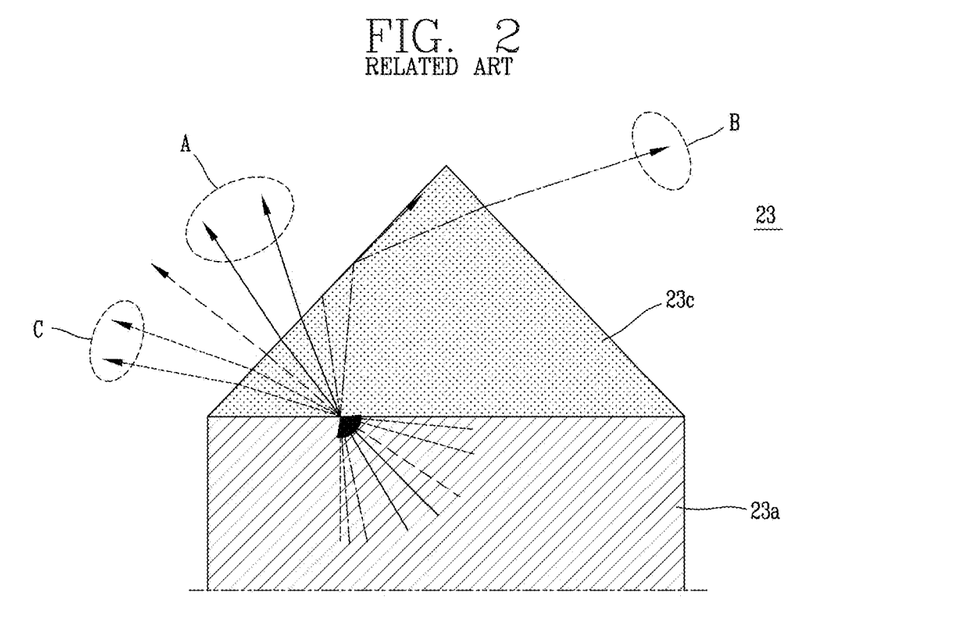
FIG. 2 is a sectional view showing refraction characteristics of light passing through a prism sheet.

FIG. 2 is a sectional view showing the refraction characteristics of the light passing through the prism sheet.

Referring to FIG. 2, the prism sheet 23 includes a flat base film 23a and a plurality of prism patterns 23c arranged on the base film 23a in a particular direction. The prism patterns 23c are formed of an acrylic resin having a high refractive index.

According to Snell's law, some light passing through the prism patterns 23c is refracted and directed toward an observer (region 'A'), while some light is recycled by total reflection.

Part of the light transmitted through the air through the prism patterns 23c is refracted along a thread of the prism patterns 23c by Snell's law to thus be directed toward the observer (region 'A'). In addition, although part of the light is recycled by total reflection, the light incident at an angle more than or less than a certain angle is refracted toward an invalid area (region 'B or C') and is thus lost.

The light refracted toward the invalid area is light that is not directed toward an observer located perpendicularly to the prism sheet 23. The light refracted to the invalid area may occur by total reflection due to a difference of refractive indexes between two media (e.g., the prism patterns 23c and air).

SUMMARY

An aspect of the detailed description is to provide a prism sheet to improve optical efficiency and a liquid crystal display device having the same.

To achieve these and other advantages and according to the purpose of this specification, as embodied and broadly described herein, there is provided a prism sheet including: a base film; and a plurality of prism patterns on the base film in a stripe shape, and having a concave surface on a bottom surface thereof.

The prism sheet may further include an auxiliary resin layer that may be between the base film and the prism patterns.

A surface of the base film or the auxiliary resin layer may have a convex surface corresponding to the concave surface of the prism pattern.

The auxiliary resin layer may have a higher refractive index than the base film, and the prism patterns may have a higher refractive index than the auxiliary resin layer.

The concave surface of the prism pattern may be configured to change a path of light that is reflected from one inclined surface of the prism pattern and refracted toward an invalid area through the other inclined surface of the prism pattern.

The auxiliary resin layer or the base film may have a groove (or a trench pattern) having a particular depth along a length of the $2n^{th}$ prism pattern, where 'n' is a natural number.

A surface of the groove (or the trench pattern) may have a convex surface.

A bottom surface of the $2n^{th}$ prism pattern may have a concave surface corresponding to the convex surface of the groove (or the trench pattern).

A bottom surface of the $2n-1^{th}$ prism pattern may be flat.

The concave bottom surface of the $2n^{th}$ prism pattern may be configured to change a path of light that is refracted toward an invalid area at an inclined surface of the $2n^{th}$ prism pattern to the adjacent $2n-1^{th}$ prism pattern.

To achieve these and other advantages and according to the purpose of this specification, as embodied and broadly described herein, there is also provided a liquid crystal display device, including: a liquid crystal panel; and a backlight on a rear surface of the liquid crystal panel to supply light to the liquid crystal panel, wherein the backlight comprises a prism sheet having a plurality of elongated prism segments aligned adjacent to one another, with at least some of the prism segments having a bottom surface configured to improve optical efficiency by changing a refractive angle of light, which is incident onto the prism sheet at an angle less than a minimum angle, into an effective angle.

The bottom surface may be concave with a particular degree of curvature sufficient to change the refractive angle of light, which is incident onto the prism sheet at an angle less than a minimum angle, into the effective angle.

The prism sheet may include a substrate, a prism pattern layer formed of the elongated prism segments, and a resin layer between the substrate and the prism pattern layer.

A surface of the substrate or the resin layer may have a convex surface corresponding to the concave bottom surface of the prism sheet.

The resin layer or the substrate may have a groove (or a trench) having a particular depth along a length of the $2n^{th}$ prism segment, where 'n' is a natural number.

A surface of the groove (or the trench) may have a convex surface.

A bottom surface of the $2n^{th}$ prism segment may have a concave surface corresponding to the convex surface of the groove (or the trench).

The present disclosure can have the following advantages.

In the prism sheet and the liquid crystal display (LCD) device having the same, optical efficiency of the prism sheet can be enhanced by changing a refractive angle of light that is incident at an angle less than a minimum angle to an effective angle by forming a concave surface on the bottom surface of the prism patterns.

Also, in the prism sheet and the liquid crystal display device having the same, optical efficiency of the prism sheet can be enhanced by refracting light that is incident at an angle more than a maximum angle toward the adjacent prism pattern by forming the bottom surface of the $2n^{th}$ prism pattern in the groove of the base film.

Further, in the prism sheet and the liquid crystal display (LCD) device having the same, power consumption can be reduced as light collection efficiency is increased, and manufacturing costs can be reduced as a light source of low intensity can be used.

Further scope of applicability of the present application will become more apparent from the detailed description given hereinafter. However, it should be understood that the detailed description and specific examples, while indicating preferred embodiments of the disclosure, are given by way of illustration only, since various changes and modifications will become apparent to those skilled in the art from the detailed description.

BRIEF DESCRIPTION OF THE DRAWINGS

The accompanying drawings, which are included to provide a further understanding of the present disclosure and are incorporated in and constitute a part of this specification, illustrate exemplary embodiments and together with the description serve to explain the principles of the disclosure.

In the drawings.

DETAILED DESCRIPTION

A description will now be given in detail of illustrated configurations of a prism sheet and a liquid crystal display device having the same according to the present disclosure, with reference to the accompanying drawings.

Advantages and features of the present disclosure and methods of achieving those will be clearly understood with reference to the accompanying drawings and exemplary embodiments to be explained later in detail. Exemplary embodiments of the inventive concepts may, however, be embodied in many different forms and should not be construed as being limited to the embodiments set forth herein; rather, these embodiments are provided so that this disclosure will be thorough and complete, and will fully convey the concepts in the example embodiments to those of ordinary skill in the art. The same/like reference symbols refer to the same/like components throughout the specification. In the drawings, the thicknesses of layers and regions may be exaggerated for clarity.

It will be understood that when an element is referred to as being "on" another element, the element can be located directly on the other element or intervening elements may also be present. In contrast, when an element is referred to as being "directly on" another element, there are no intervening elements present.

Spatially relative terms, such as "beneath," "below," "lower," "above," "upper" and the like may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Thus, the exemplary term "below" can encompass both an orientation of above and below.

The terminology used herein is for the purpose of describing particular embodiments only and is not intended to be limiting of the example embodiments. As used herein, the singular forms are intended to include the plural forms as well, unless the context clearly indicates otherwise. It will be further understood that the terms "comprises," "comprising," "includes," and/or "including," if used herein, specify the presence of stated steps, operations, elements, and/or components, but do not preclude the presence or addition of one or more other features, integers, steps, operations, elements, components, and/or groups thereof.

The liquid crystal display device may include a liquid crystal panel configured to output an image via pixels arranged in a matrix form, and a backlight installed on a rear surface of the liquid crystal panel and configured to supply light to the liquid crystal panel.

The liquid crystal display device may further include a guide panel configured to accommodate the liquid crystal panel and the backlight therein.

The liquid crystal panel may include first and second substrates attached to each other in a state where a liquid crystal layer is interposed therebetween, and first and second polarizing plates attached onto an outer surface of the first and second substrates, respectively.

A plurality of pixels having transparent pixel electrodes and thin film transistors for turning on/off liquid crystal driving voltages to be transmitted to the pixel electrodes may be formed on an inner surface of the first substrate. A color filter for implementation of colors and a transparent common electrode may be formed on an inner surface of the second substrate.

For example, the first substrate may include a plurality of gate and data lines which are arranged in a row direction and a column direction, respectively, to define a plurality of pixel regions, a switching element such as the thin film transistor formed at a crossing area between the gate and data lines, and the pixel electrode formed at the pixel region.

The second substrate may include a color filter composed of a plurality of sub-color filters which implement red, green, and blue colors, a black matrix to block unnecessary light from being transmitted at a boundary region between the sub-color filters through the liquid crystal layer, and a transparent common electrode configured to apply a voltage to the liquid crystal layer.

However, the present disclosure is not limited to this twisted nematic (TN) mode. The present disclosure is applicable, regardless of a liquid crystal mode, to an in plane switching (IPS) mode or a fringe field switching (FFS) mode in which a common electrode with the pixel electrode are formed on the inner surface of the first substrate, as well as a vertical alignment (VA) mode.

The above-described liquid crystal panel does not emit light spontaneously. Thus, in various embodiments, a backlight configured to supply light to the liquid crystal panel is positioned on the rear surface of the liquid crystal panel.

Figure 3:
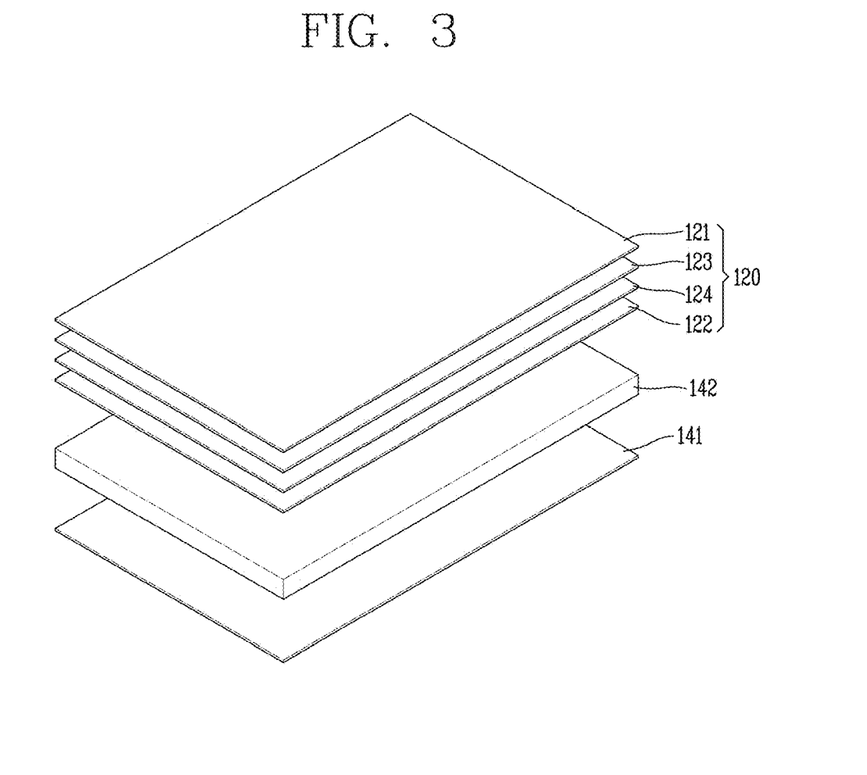
FIG. 3 is an exemplary exploded perspective view showing a structure of a backlight according to a first embodiment of the present disclosure.

FIG. 3 is an exemplary exploded perspective view showing a structure of a backlight according to the first embodiment of the present disclosure.

FIG. 3 shows an example of an edge type backlight having a light source located at one side of the liquid crystal panel, but the present disclosure is not limited thereto. The present disclosure is also applicable to a direct type backlight device in which a light source is located on the rear surface of the liquid crystal panel.

Referring to FIG. 3, the backlight according to the present disclosure includes a light guide plate 142 to guide light incident through a side surface of the light guide plate 142 facing a light source toward the liquid crystal panel.

The backlight may include a reflection sheet 141 disposed on a rear surface of the light guide plate 142, and a plurality of optical sheets 120 disposed on a front surface of the light guide plate 142 to improve efficiency of light transmitted through the light guide plate 142 and to irradiate a liquid crystal panel 110 with light.

However, the present disclosure is not limited to the above-described structure of the backlight, and any structure of the backlight may be applied to the liquid crystal display device according to the present disclosure.

The light source may be any one of a cold cathode fluorescent lamp (CCFL), a hot cathode fluorescent lamp (HCFL), an external electrode fluorescent lamp (EEFL), and a light emitting diode (LED). For example, an LED array may be used as the light source. In this case, an LED printed circuit board configured with circuitry to drive the light source may constitute an LED assembly with the LED array. The light source may be connected to an inverter and then receive electric power for emitting light.

The light emitted from the light source is incident onto a side surface of the light guide plate 142 formed of a transparent material. The reflection sheet 141 disposed on the rear surface of the light guide plate 142 reflects the light transmitted to the rear surface of the light guide plate 142 toward the optical sheets 120 disposed on an upper surface of the light guide plate 142, thereby reducing loss of light and improving uniformity of light.

For example, the optical sheets 120 may include upper and lower diffusion sheets 121 and 122, and upper and lower prism sheets 123 and 124. The optical sheets 120 may further include a protection sheet. However, the present disclosure is not limited thereto.

The lower diffusion sheet 122 diffuses light incident from the light guide plate 142 to prevent spots from occurring on an image displayed on the liquid crystal panel or to improve brightness uniformity of the liquid crystal panel, and refracts the light in a direction perpendicular to the light guide plate 142.

The light diffused and refracted through the lower diffusion sheet 122 may be uniformly incident on the front surface of the liquid crystal panel by the upper and lower prism sheets 123 and 124.

The protection sheet serves to prevent the optical sheets 120 from being damaged from dust or scratches, and to prevent movement of the optical sheets 120 with respect to the backlight.

In various embodiments, the backlight of the present disclosure improves the optical efficiency of the prism sheets 123 and 124 by changing a refractive angle of light that is incident onto the prism sheets 123 and 124 at an angle less than a minimum angle into an effective angle by means of a concave surface formed on a bottom surface of a prism pattern of the prism sheets 123 and 124.

Figure 4A:
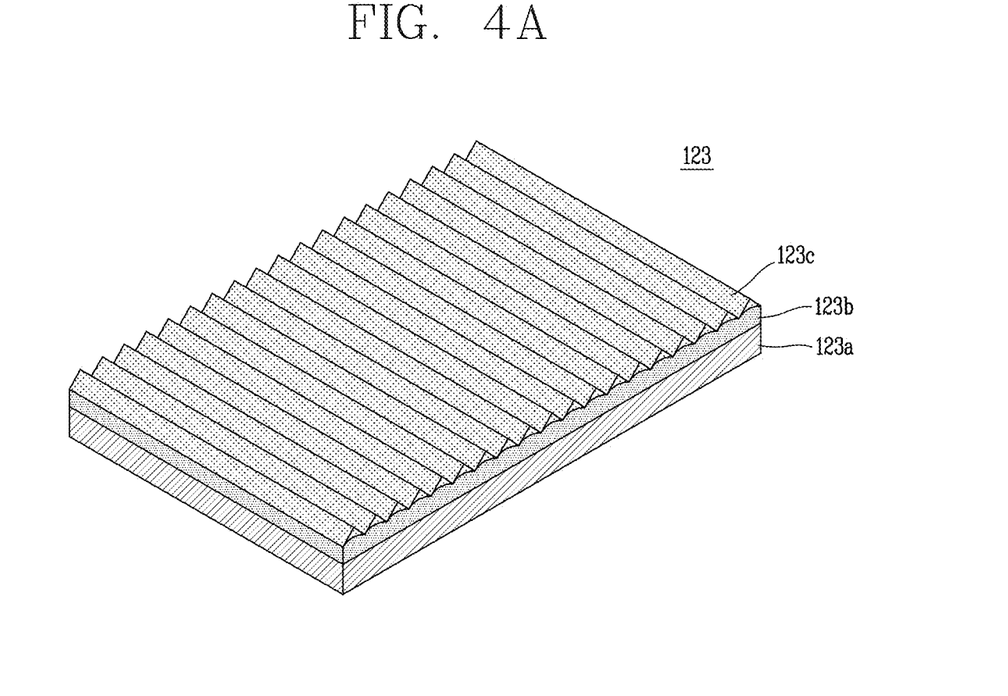
FIGS. 4A and 4B are a perspective view and a sectional view, respectively, schematically showing a prism sheet according to a first embodiment of the present disclosure.
Figure 4B:
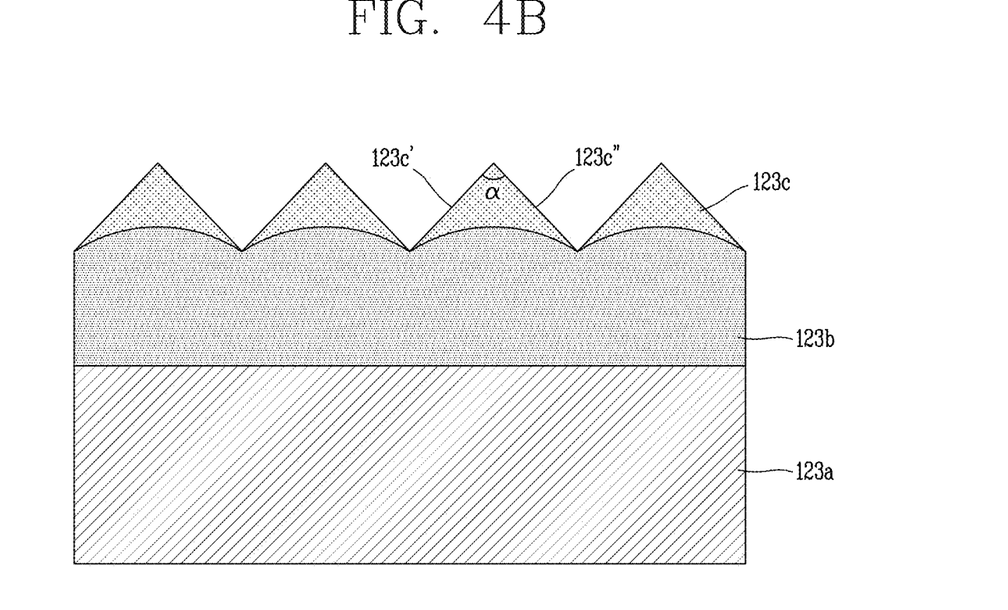

FIGS. 4A and 4B are a perspective view and a sectional view, respectively, schematically showing a prism sheet according to a first embodiment of the present disclosure.

For convenience of explanation, FIGS. 4A and 4B show an upper prism sheet, but a lower prism sheet may also be formed with substantially the same configuration.

Referring to FIGS. 4A and 4B, the prism sheet 123 according to a first embodiment of the present disclosure may include a base film 123a and a plurality of prism patterns 123c disposed over the base film 123a.

The prism patterns 123c may be arranged in a stripe shape. The base film 123a may be made of polyester, such as polyethylene terephthalate (PET). The prism patterns 123c may be made of an acrylic resin having a high refractive index. When the plurality of prism patterns 123c are arranged to have columns in one direction, a sectional surface of the prism patterns 123c may have an approximately triangular prism shape.

The triangular prism patterns 123c may include first and second inclined surfaces 123c' and 123c" having a predetermined angle ($\alpha$) relative to each other. The included angle ($\alpha$) may be 86, 88, 89, 90°, etc.

An auxiliary resin layer 123b may be interposed between the base film 123a and the prism patterns 123c. In this case, a surface of the auxiliary resin layer 123b may have a convex shape along the columns of the prism patterns 123c, and thus a bottom surface of the prism patterns 123c may have a concave shape.

The auxiliary resin layer 123b may easily be formed into the convex shape on its surface with a printing method using a soft mold, since it can be processed more easily than the base film 123a formed of PET.

However, the present disclosure is not limited to the above-described structure of the prism sheet 123. The prism patterns 123c may be directly disposed on the base film 123a without the auxiliary resin layer 123b therebetween. In this case, the surface of the base film 123a may have a convex shape.

The auxiliary resin layer 123b may be made of a resin having a lower refractive index than the prism patterns 123c.

Light incident onto the prism sheet 123 from the backlight (e.g., light incident onto the prism sheet 123 through a bottom surface of the prism sheet 123 from the light guide plate) may be emitted to three areas, namely a total reflection region, a light collection region (e.g., region 'A' in FIG. 2), and a side lobe region (e.g., regions 'B and C' in FIG. 2).

Specifically, light emitted to the total reflection region, which is perpendicularly incident to the prism sheet 123, may be totally reflected by the first and second inclined surfaces 123c' and 123c" of the prism patterns 123c, and may be incident onto the light guide plate again. Part of the light re-incident onto the light guide plate may be recycled to be condensed by the prism sheet 123.

In addition, light emitted to the light collection region (region 'A'), which is incident onto the prism sheet 123 at a predetermined angle, may be refracted by the first inclined surface 123c' or the second inclined surface 123c" of the prism patterns 123c to thus be condensed.

However, light incident onto the prism sheet 123 at a predetermined angle, that is, an angle less than a minimum angle or more than a maximum angle, may be refracted to an invalid area (e.g., regions 'B and C') and thus is lost.

Figure 5A:
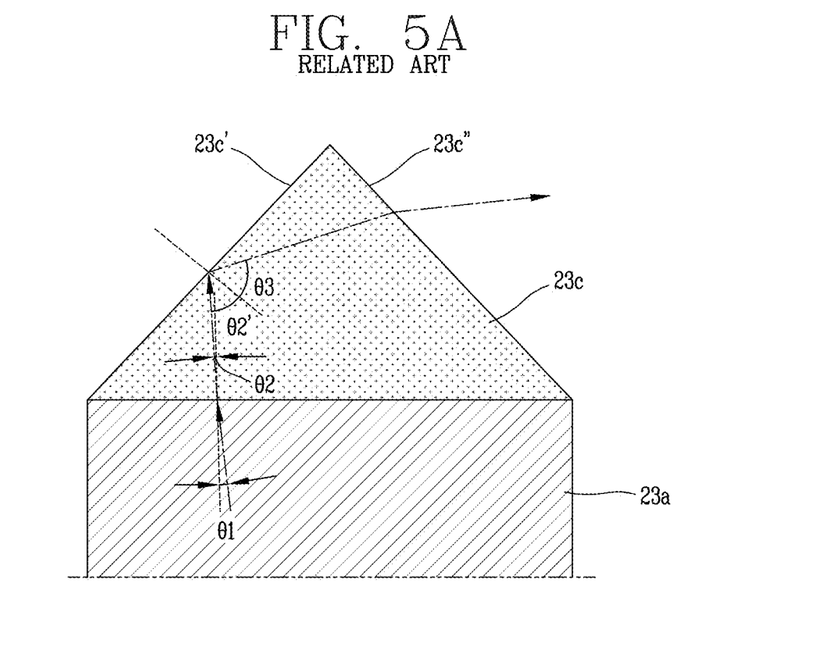
FIGS. 5A and 5B are cross sectional views showing examples of paths of light that is incident at an angle less than a minimum angle, according to a conventional prism sheet and a prism sheet according to the first embodiment of the present disclosure, respectively.
Figure 5B:
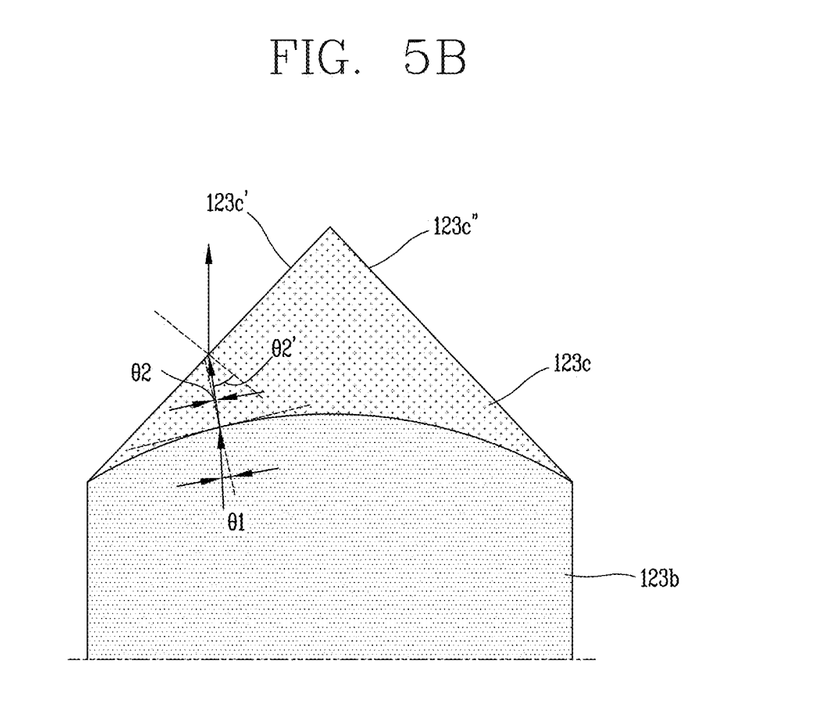

FIGS. 5A and 5B are cross sectional views showing examples of paths of light that is incident at an angle less than a minimum angle according to a first embodiment of the present disclosure.

FIG. 5A shows a path of refracted light initially incident on a conventional prism sheet at an angle less than a minimum angle. FIG. 5B shows a path of refracted light initially incident on a prism sheet according to the first embodiment of the present disclosure at an angle less than a minimum angle.

Referring to FIG. 5A, light is incident at an angle of $\theta 1$ from the base film 23a having a refractive index of n1 to the prism pattern 23c having a refractive index of n2. Thus, the light is refracted at an angle of $\theta 2$ in accordance with Snell's law.

In the case of light incident at an angle less than the minimum angle, the light is refracted at the first inclined surface 23c' or the second inclined surface 23c", and is emitted to the outside having a refractive index of n3 ($\approx 1.00$).

In this case, $\theta 1$ refers to an incident angle of light that is less than the minimum angle, and $\theta 2$ refers to a refraction angle of the light.

Here, the minimum angle is a lowest incident angle of light that is refracted to the side lobe region (region 'B') by total reflection through the first inclined surface 23c' or the second inclined surface 23c". The minimum angle may be calculated by using Snell's law as follows.

The angle (α) of the prism patterns 23c may be set as 90°, for convenience of calculation.

When light is transmitted from a thread of the prism patterns 23c to the air, a critical angle of total reflection can be calculated by the following Equation 1.

$$n2*\sin(\theta 2')=n3*\sin(\theta 3) \quad \text{[Equation 1]}$$

where, θ2' is arcsin((n3/n2)*sin(90)), because θ3 is 90° when total reflection occurs.

Under the above conditions, if the refractive indexes n2 and n3 are 1.64 and 1, respectively, θ2' is 37.57°. That is, when light is incident onto the first inclined surface 23c' or the second inclined surface 23c" at an angle of 37.57° or more, the light is refracted to the side lobe region (region 'B') by total reflection.

Next, when light is incident to be refracted from the base film 23a to the prism patterns 23c, the incident angle θ1 of the light to make the aforementioned incident angle θ2' of 37.57° may be calculated by the following Equation 2.

$$n1*\sin(\theta 1)=n2*\sin(\theta 2) \quad \text{[Equation 2]}$$

Since θ2 is 90°−45°−θ2', it has a value of 7.43°. Thus, θ1 is arcsin((n2/n1)*sin(7.43)). Under these conditions, when the refractive index, n1, is 1.49, θ1 is 8.18°.

Considering that light is incident from both sides of the base film 23a, the light is refracted to the side lobe region (region 'B') by total reflection if the light is incident at an angle in the range of −8.18 to 8.18° in the base film 23a.

Referring to FIG. 5B, in the first embodiment of the present disclosure, the surface of the auxiliary resin layer 123b or the base film is a convex surface on the basis of a single column where the prism patterns 123c are arranged. That is, the bottom surface of the prism pattern 123c is a concave surface.

In this case, the path of incident light at a minimum angle, that is about 8° or less, is different from the conventional one, since the normal line at a refraction point is inclined at an angle greater than in the conventional art)(0°). That is, even if light is incident at the same angle as the conventional angle (θ1), the light is incident onto the first inclined surface 123c' or the second inclined surface 123c" at a smaller angle (θ2') than the angle of 37.57°, and refracted to the air, resulting in enhanced light collection. Therefore, optical efficiency of the prism sheet may be improved.

The concave surface of the prism pattern may be provided in a groove formed in the base film or the auxiliary resin layer. In this case, loss of incident light that is incident at an angle exceeding a maximum angle may be minimized, which will be described in detail with reference to a second embodiment of the present disclosure.

Figure 6:
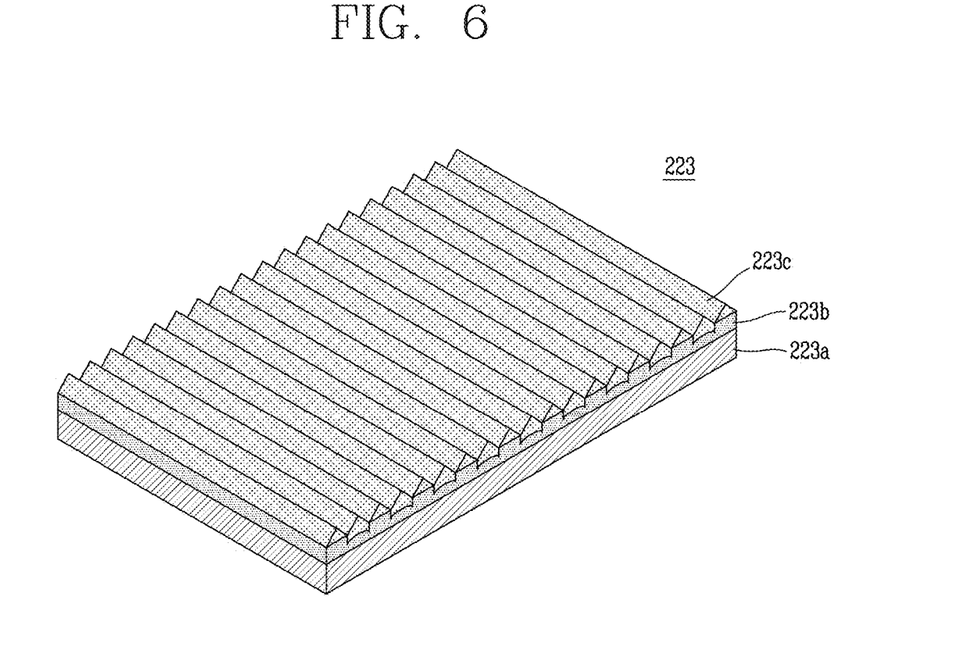
FIG. 6 is a perspective view schematically showing a prism sheet according to a second embodiment of the present disclosure.
Figure 7:
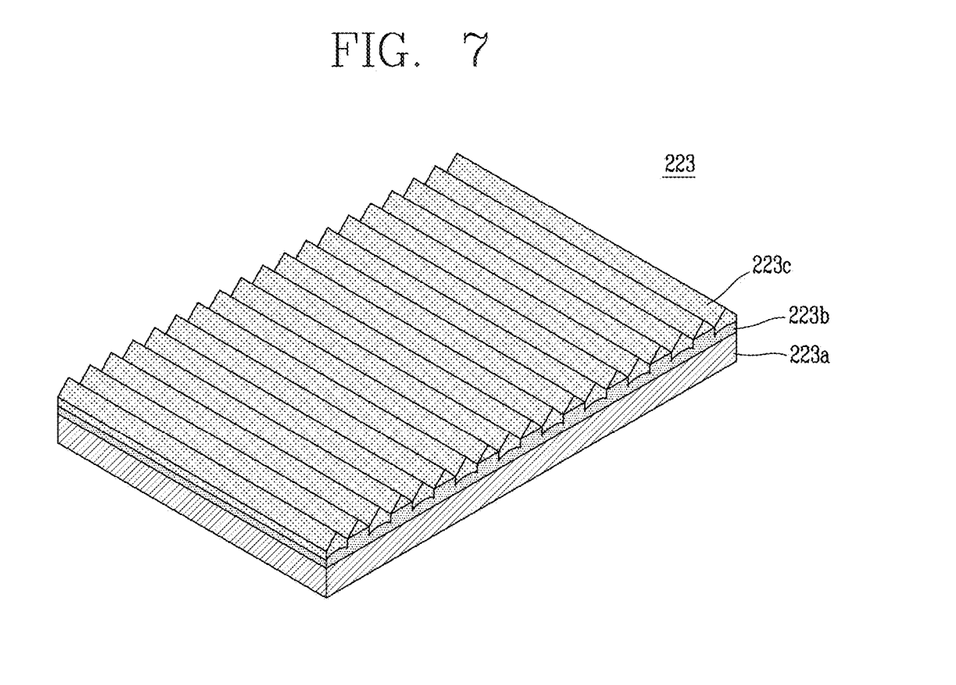
FIG. 7 is a perspective view schematically showing another prism sheet according to a second embodiment of the present disclosure.

FIG. 6 is a perspective view schematically showing a prism sheet according to a second embodiment of the present disclosure, and FIG. 7 is a perspective view schematically showing another prism sheet according to a second embodiment of the present disclosure.

Figure 8:
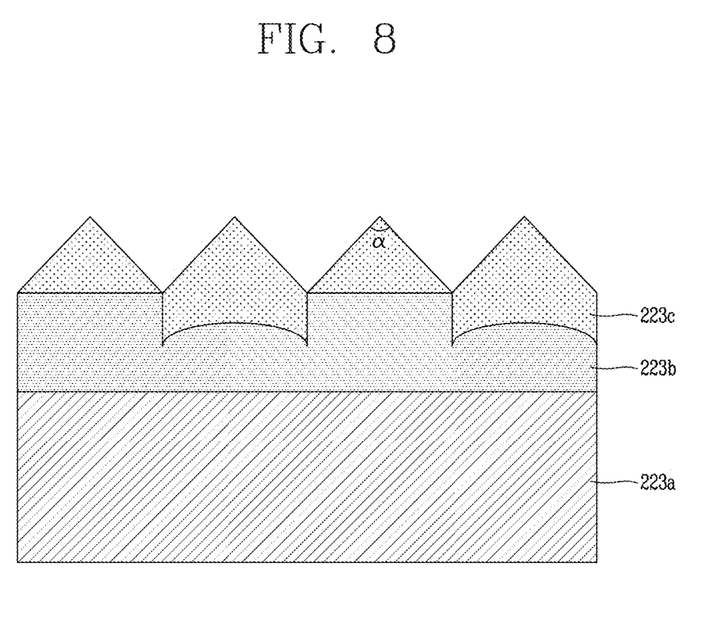
FIG. 8 is a sectional view schematically showing a prism sheet according to a second embodiment of the present disclosure.

FIG. 6 shows a case of forming the bottom surface of the $2n^{th}$ prism pattern (where 'n' is a natural number) in the groove of the base film, as an example. FIG. 7 shows a case of forming the bottom surface of the $2n-1^{th}$ prism pattern in the groove of the base film, as an example. FIG. 8 is a sectional view schematically showing a prism sheet according to a second embodiment of the present disclosure.

Referring to FIGS. 6 to 8, the prism sheet 223 according to the second embodiment of the present disclosure may include a base film 223a and a plurality of prism patterns 223c disposed over the base film 223a. The prism patterns 223c may be arranged in a stripe shape. As described above, the base film 223a may be made of polyester such as PET. The prism patterns 223c may be made of an acrylic resin having a high refractive index.

When the plurality of prism patterns 223c are arranged to have columns in one direction, a sectional surface of the prism pattern 223c may have a triangular prism shape or an approximate pentagonal shape. That is, the plurality of prism patterns 223c disposed on the base film 223a may alternately have a triangular prism shape and an approximate pentagonal shape.

The approximate pentagonal shape means that the sectional surface of the prism pattern 223c has an approximately pentagonal shape, although the bottom surface of the prism pattern 223c has a curved surface. The prism patterns 223c may include first and second inclined surfaces 223c' and 223c" having a predetermined included angle (α) relative to each other. The included angle (α) may be 86, 88, 89, 90°, etc.

An auxiliary resin layer 223b may be interposed between the base film 223a and the prism patterns 223c. In this case, the auxiliary resin layer 223b may have a groove (or a trench pattern) of a predetermined depth therein along a length of the $2n^{th}$ (or $2n-1^{th}$) prism patterns 223c. Thus, the surface of the groove may form a convex surface. In this case, the bottom surface of the $2n^{th}$ (or $2n-1^{th}$) prism patterns 223c may form a concave surface.

The auxiliary resin layer 223b may be easily formed into the groove, and the convex surface on the surface of the groove, with a printing method using a soft mold, since it can be processed more easily than the base film 223a formed of PET. For instance, a groove may be formed in the auxiliary resin layer 223b by using a soft mold, and then the prism patterns 223c may be formed.

However, the present disclosure is not limited to the above-described structure of the prism sheet 223. The prism patterns 223c may be directly disposed on the base film 223a without the auxiliary resin layer 223b therebetween. In this case, the groove may be formed in the base film 223a, and the surface of the groove may be formed to be a convex surface.

The auxiliary resin layer 223b may be made of a resin having a lower refractive index than the prism patterns 223c.

According to the above-described prism sheet 223 according to the second embodiment of the present disclosure, optical efficiency of the prism sheet 223 may be improved by changing a refractive angle of light that is incident at an angle less than a minimum angle to an effective angle, by forming a concave surface on the bottom surface of the prism patterns 223c.

Further, according to the prism sheet 223 according to the second embodiment of the present disclosure, optical efficiency of the prism sheet 223 may be further improved by refracting light that is incident at an angle more than a maximum angle into the adjacent prism sheet 223, by forming the bottom surface of the $2n^{th}$ (or $2n-1^{th}$) prism patterns 223c into the groove inside the auxiliary resin layer 223b (or the base film 223a).

Figure 9A:
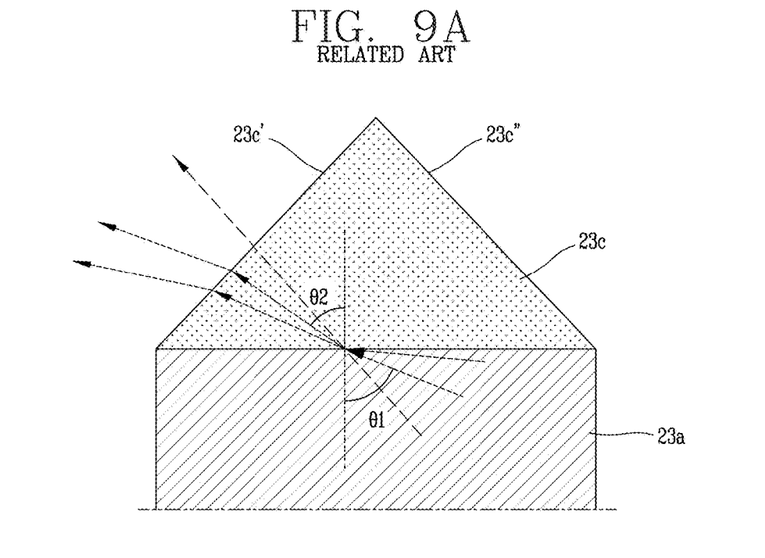
FIGS. 9A and 9B are cross sectional views showing examples of movement of light that is incident at an angle more than a maximum angle, according to a conventional prism sheet and a prism sheet according to the second embodiment of the present disclosure, respectively.
Figure 9B:
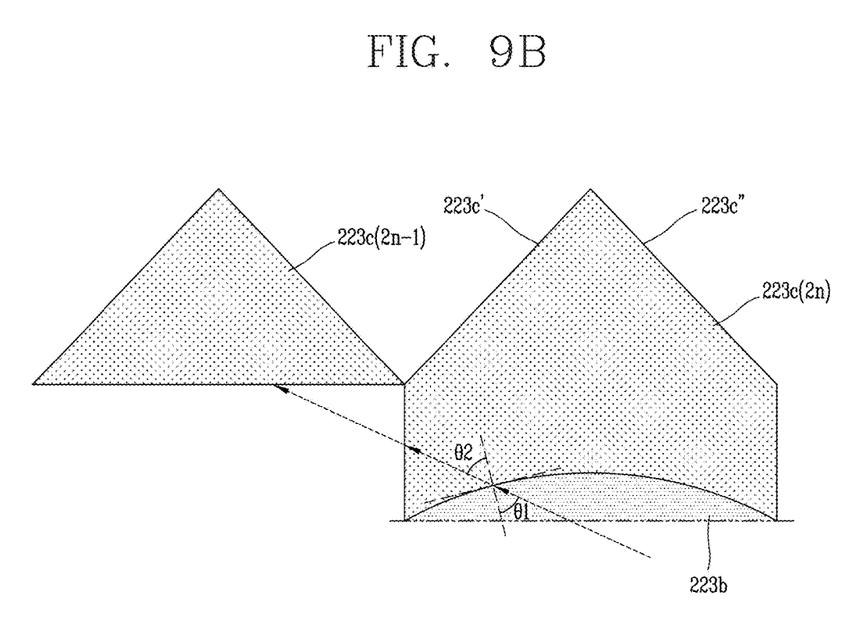

FIGS. 9A and 9B are sectional views showing examples of paths of light that is incident at an angle more than a maximum angle, according to a conventional prism sheet and a prism sheet according to the second embodiment of the present disclosure, respectively.

FIG. 9A shows a path of refracted light initially incident on a conventional prism sheet at an angle more than a maximum angle. FIG. 9B shows a path of refracted light initially incident on a prism sheet according to the second embodiment of the present disclosure at an angle more than a maximum angle.

Referring to FIG. 9A, light, that is incident onto the prism patterns $23c$ at an angle more than a maximum angle (e.g., 50°), is refracted to a region below a valid area (region 'C') at the first inclined surface $23c'$ or the second inclined surface $23c''$ of the prism patterns $23c$, and is thus lost. The included angle of the prism patterns $23c$ may be set as 90°, for convenience of calculation.

Referring to FIG. 9B, in the second embodiment of the present disclosure, the surface of the auxiliary resin layer $223b$ or the base film of the $2n^{th}$ prism pattern $223c$ forms a convex surface. That is, the bottom surface of the $2n^{th}$ prism pattern $223c(2n)$ forms a concave surface.

In this case, the path of light that is incident at an angle more than a maximum angle (e.g., 50°) is different from the conventional art, since the normal line at a refraction point is inclined at an angle greater than in the conventional art (0°).

That is, even if light is incident at the same angle as the conventional angle ($\theta$1) and is refracted to a region below a valid area at the first inclined surface $223c'$ or the second inclined surface $223c''$ of the $2n^{th}$ prism pattern $223c$, the refracted light meets the adjacent $2n-1^{th}$ prism pattern $223c$.

In the present disclosure, optical efficiency of the prism sheet can be enhanced by refracting light that is incident at an angle more than a maximum angle toward the adjacent prism pattern for recycling.

Some effects of the present disclosure will be described in more detail.

First, in various embodiments of the present disclosure, an emission angle of backlight is reduced by about 10°. Thus, optical efficiency is improved by about 22% when compared to the conventional art.

Figure 10A:
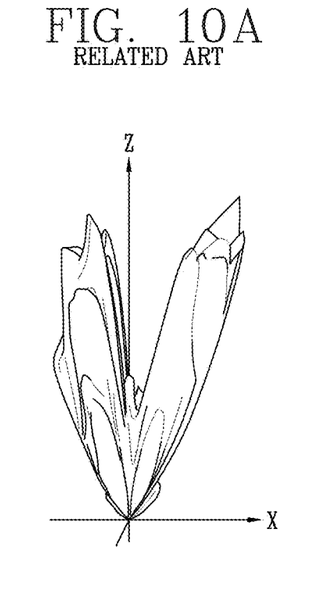
FIGS. 10A and 10B are views showing intensity distribution curves of backlight when using a conventional prism sheet and a prism sheet according to an embodiment of the present disclosure, respectively.
Figure 10B:
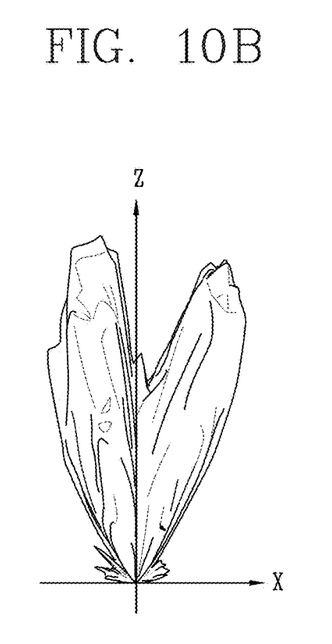

FIGS. 10A and 10B are views showing intensity distribution curves of backlight, which show an angle of light during light emission. FIG. 10A shows an intensity distribution curve when using a conventional prism sheet. FIG. 10B shows an intensity distribution curve when using the prism sheet of an embodiment of the present disclosure.

Referring to FIGS. 10A and 10B, in the case of using the prism sheet of an embodiment of the present disclosure, the intensity of light emitted at an angle of 90° may be greater than in the conventional art. Thus, it can be seen that light collection is improved.

Figure 11A:
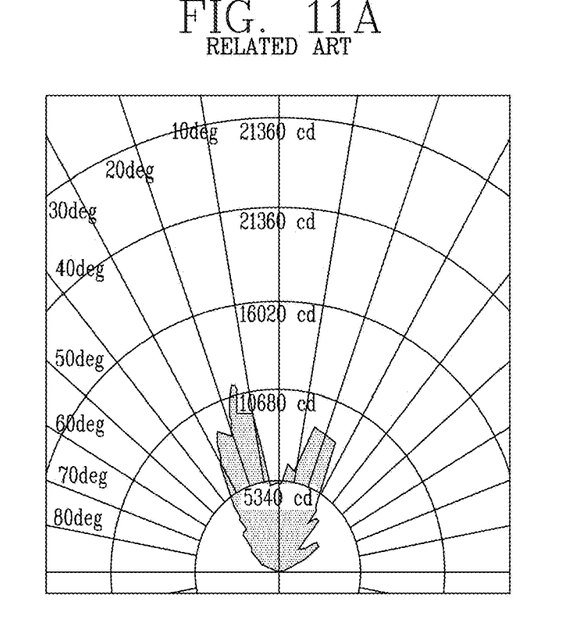
FIGS. 11A and 11B are views showing polar curves of backlight when using a conventional prism sheet and a prism sheet according to an embodiment of the present disclosure, respectively.
Figure 11B:
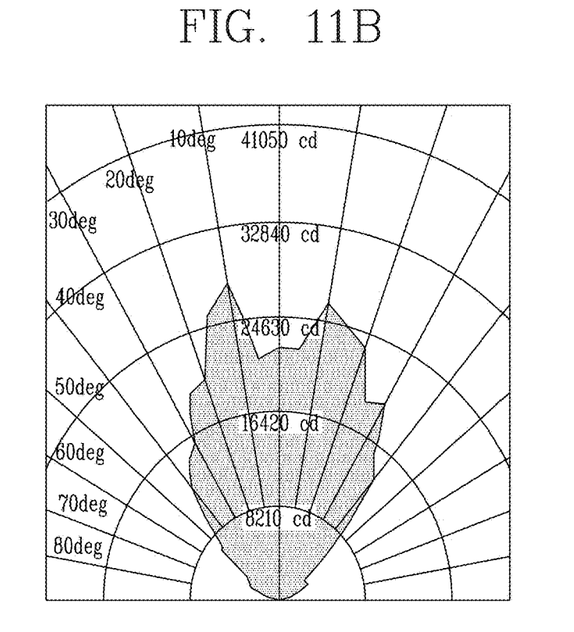

FIGS. 11A and 11B are views showing polar curves of backlight, which show intensity distribution from a side surface.

FIG. 11A shows polar curves at a 90° azimuth angle of backlight when using a conventional prism sheet. FIG. 11B shows polar curves at a 90° azimuth angle of backlight when using a prism sheet of an embodiment of the present disclosure.

Referring to FIGS. 11A and 11B, the intensity of light at 90° in the conventional art is 10,680 cd at a 10° polar angle, whereas the intensity of light at 90° according to the present disclosure is 24,630 cd at 10° polar angle. Thus, the intensity of light is increased in the present disclosure more than 2 times.

Hereinafter, processes of manufacturing the prism sheet according to embodiments of the present disclosure will be explained in detail.

Figure 12:
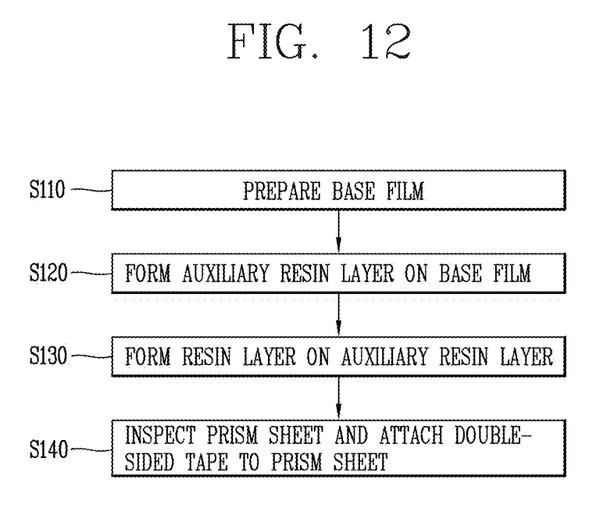
FIG. 12 is a flow chart showing the manufacturing process of embodiments of the prism sheet according to the present disclosure in sequence.

FIG. 12 is a flow chart sequentially showing manufacturing processes of the prism sheet according to embodiments of the present disclosure.

First, a base film made of polyester such as PET is prepared (S110). Then, an auxiliary resin layer is formed on the base film (S120). The auxiliary resin layer may be made of a resin having a higher refractive index than the base film. Since the auxiliary resin layer may be formed by a printing method using a soft mold, it can be processed more easily than the base film formed of PET.

It is possible to form grooves (or trench patterns) with a convex surface in the auxiliary resin layer. For example, the auxiliary resin layer is formed on the base film by applying a resin through a nozzle. Then, grooves are formed in the auxiliary resin layer by a printing method using a soft mold with a pattern corresponding to the grooves. The grooves may be formed regularly along columns of the prism patterns. The groove may be formed to have a predetermined depth along a length of the $2n^{th}$ (or $2n-1^{th}$) prism patterns to be formed later. The auxiliary resin layer having the groove may be cured by ultraviolet (UV) rays. Then, a prism pattern is formed on the base film where the auxiliary resin layer has been formed (S130).

For example, a resin layer is formed on the base film where the auxiliary resin layer has been formed by applying a resin through a nozzle. Then, the prism patterns are formed on the resin layer, by pressing the soft mold having a prism shape with a printing method. The prism patterns may be made of an acrylic resin having a higher refractive index than the auxiliary resin layer.

When the plurality of prism patterns are arranged to have columns in one direction, a sectional surface of the prism patterns may have a triangular prism shape or an approximately pentagonal shape. That is, the plurality of prism patterns disposed on the base film may have alternately a triangular prism shape and an approximately pentagonal shape.

The prism patterns may include first and second inclined surfaces having a predetermined included angle relative to each other. The included angle may be 86, 88, 89, 90°, etc.

A bottom surface of the $2n^{th}$ (or $2n-1^{th}$) prism patterns may be a concave surface according to a shape of the groove of the auxiliary prism resin. The prism patterns formed by the soft mold may be cured primarily by UV rays. In this case, the soft mold may be formed of the same shape as a mother prism sheet. Thereafter, secondary curing by UV rays and irradiation of infrared (IR) rays may be executed. Then, the manufactured prism sheet is inspected with respect to foreign materials, defects, etc., and a double-sided tape is attached to the prism sheet (S140).

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A prism sheet, comprising:
a base film;
a plurality of prism patterns on the base film in a stripe shape; and
an auxiliary resin layer between the base film and the prism patterns, wherein a bottom surface of a $2n^{th}$ prism pattern is an elliptical concave surface, and a bottom surface of a $2n-1^{th}$ prism pattern is flat, where 'n' is a natural number, and wherein a surface of the base film or the auxiliary resin layer has a convex surface corresponding to the elliptical concave surface of the prism patterns.

2. The prism sheet of claim 1, wherein the auxiliary resin layer has a higher refractive index than the base film, and the prism patterns have a higher refractive index than the auxiliary resin layer.

3. The prism sheet of claim 1, wherein the elliptical concave surface of the prism patterns is configured to change a path of light that is reflected at one inclined surface of the prism pattern and refracted toward an invalid area through the other inclined surface of the prism pattern.

4. The prism sheet of claim 1, wherein the concave bottom surface of the $2n^{th}$ prism pattern is configured to change a path of light that is refracted toward an invalid area at an inclined surface of the $2n^{th}$ prism pattern to an adjacent $2n-1^{th}$ prism pattern.

5. A liquid crystal display device, comprising:
a liquid crystal panel; and
a backlight on a rear surface of the liquid crystal panel to supply light to the liquid crystal panel,
wherein the backlight comprises a prism sheet having a plurality of elongated prism segments aligned adjacent to one another, with at least some of the prism segments having a bottom surface of an elliptical concave shape configured to improve optical efficiency by changing a refractive angle of light, which is incident onto the prism sheet at an angle less than a minimum angle, into an effective angle,
wherein the prism sheet includes a substrate, a prism pattern layer having the elongated prism segments, and a resin layer between the substrate and the prism pattern layer,
wherein the resin layer or the substrate has a groove or a trench having a particular depth along a length of a $2n^{th}$ prism segment, where 'n' is a natural number, and
wherein a bottom surface of a 2n-1th prism pattern is flat.

6. The device of claim 5, wherein the bottom surface is concave with a particular degree of curvature sufficient to change the refractive angle of light, which is incident onto the prism sheet at the angle less than the minimum angle, into the effective angle.

7. The device of claim 5, wherein a surface of the groove or the trench is an elliptical convex surface.

8. The device of claim 7, wherein a bottom surface of the $2n^{th}$ prism segment is a concave surface corresponding to the convex surface of the groove or the trench.

9. A display device, comprising:
a panel; and
an optical sheet being disposed under the panel, and including a base film, a plurality of prism patterns on the base film in a stripe shape, and an auxiliary resin layer being interposed between the base film and the plurality of prism patterns,
wherein the plurality of prism patterns include a first inclined surface, a second inclined surface having an angle with the first inclined surface, and a bottom surface,
wherein among the plurality of prism patterns $2n^{th}$ prism pattern has a curved bottom surface of a concave shape, and $2n-1^{th}$ prism pattern has a flat bottom surface, where 'n' is a natural number, and
wherein an upper surface of the auxiliary resin layer corresponding to the curved bottom surface of the concave shape has a curved surface of a convex shape along the curved bottom surface of the concave shape.

10. The display device of claim 9, wherein a cross-sectional shape of the prism pattern having the curved bottom surface of the concave shape has an approximate pentagonal shape.

* * * * *